_United States Patent_ [19]

Kobayashi et al.

[11] Patent Number: 5,012,908

[45] Date of Patent: May 7, 1991

[54] CONTROL COUPLING FOR TORQUE TRANSMISSION

[75] Inventors: Katsuyuki Kobayashi, Aichi; Masaki Inui; Satoshi Ashida, both of Toyota; Keiichi Nakamura, Kariya; Masaji Yamamoto, Okazaki, all of Japan

[73] Assignees: Toyota Jidosha Kabushiki Kaisha, Toyota; Toyoda Koki Kabushiki Kaisha, Karyia, both of Japan

[21] Appl. No.: 474,507

[22] Filed: Feb. 2, 1990

[30] Foreign Application Priority Data

Feb. 3, 1989 [JP] Japan .................... 1-26074

[51] Int. Cl.⁵ .................... F16D 25/063; F16D 25/02; F16D 43/284
[52] U.S. Cl. .................... 192/57; 192/58 B; 192/85 AA; 192/103 F
[58] Field of Search .................... 192/58 B, 58 C, 57, 192/103 F, 85 AA, 58 R; 475/88; 74/650; 180/249

[56] References Cited

U.S. PATENT DOCUMENTS

| | | | |
|---|---|---|---|
| 1,415,841 | 5/1922 | Seitz | 192/70.2 |
| 1,861,080 | 5/1932 | Chorlton | 192/70.2 |
| 1,880,616 | 10/1932 | White | 192/70.2 |
| 3,762,241 | 10/1973 | Roper | |
| 4,058,027 | 11/1977 | Webb | |
| 4,503,952 | 3/1985 | Hesse | 192/58 B X |
| 4,905,808 | 3/1990 | Tomita et al. | 180/233 X |
| 4,921,061 | 5/1990 | Asano | 192/103 F X |

FOREIGN PATENT DOCUMENTS

| | | |
|---|---|---|
| 0283821 | 9/1980 | European Pat. Off. . |
| 0310028 | 4/1989 | European Pat. Off. . |
| 0314420 | 5/1989 | European Pat. Off. ............ 180/249 |
| 3826256 | 3/1989 | Fed. Rep. of Germany . |
| 63-28927 | 2/1988 | Japan . |
| 0240429 | 10/1988 | Japan .................... 180/249 |
| 1-126441 | 5/1989 | Japan . |
| 1-141241 | 6/1989 | Japan . |

Primary Examiner—Rodney H. Bonck
Attorney, Agent, or Firm—Oblon, Spivak, McClelland, Maier & Neustadt

[57] ABSTRACT

A control coupling for torque transmission between a pair of rotary members coaxially arranged for relative rotation, which includes a cylindrical casing mounted on one of the rotary members for rotation therewith, a friction clutch assembled within the casing, a piston axially slidably coupled within the casing for rotation therewith and being in engagement with the friction clutch, an end wall member coupled with the casing for rotation therewith and spaced from the piston to form a fluid chamber filled with an amount of viscous fluid, and a rotor disposed in the fluid chamber and mounted on the other rotary member for rotation therewith. The rotor has a plurality of radial blades extending radially outwardly therefrom and being disposed between the piston and the end wall member. The radial plates each have a base portion thickened in an axial direction to increase the amount of viscous fluid stored in the fluid chamber and an outer end portion formed thinner than the base portion, and each internal surface of the piston and end wall member exposed to the fluid chamber is formed to correspond with the opposite surfaces of the radial blade.

5 Claims, 2 Drawing Sheets 5,012,908

CONTROL COUPLING FOR TORQUE TRANSMISSION

BACKGROUND OF THE INVENTION

1. Field of the Invention

The present invention relates to a control coupling for torque transmission between a pair of rotary members coaxially arranged for relative rotation, and more particularly to a control coupling disposed in a drive system of a motor vehicle for torque transmission.

2. Description of the Related Art

This kind of control coupling is used as a torque transmission mechanism for effecting drive connection between a pair of rotary shafts coaxially arranged for relative rotation and is also used as a limited-slip differential for limiting relative roatation between a pair of coaxially arranged drive and driven members. In the former use, the control coupling is disposed in a torque transmission system of a four-wheel drive vehicle. In the latter use, the control coupling is assembled within a differential unit.

Disclosed in Japanese Patent Early Publication No. 63-240429 is a control coupling for torque transmission between a pair of rotary shafts coaxially arranged for relative rotation. The coupling includes a cylindrical casing mounted on one of the rotary shafts for rotation therewith, a multiple friction disc clutch assembled within the casing for effecting drive eonnection between the rotary shafts when it has been engaged, and a thrust mechanism assembled within the casing for producing a thrust force in accordance with a difference in rotation between the shafts and applying it to the friction disc clutch. The thrust mechanism includes a thrust piston axially slidably coupled within the casing in a fluid-tight manner for rotation therewith and being in engagement with the friction disc clutch, an end wall member coupled within the casing to rotatably support thereon one end of the other rotary shaft and spaced from the piston to form a fluid chamber filled with an amount of viscous fluid, and a rotor disposed in the fluid chamber and mounted on the other rotary shaft for rotation therewith, the rotor being integrally formed with a plurality of circumferentially spaced radial blades.

In operation of the control coupling, relative rotation of the rotor to the piston and end wall member causes the viscous fluid to flow circumferentially in a plurality of chambers subdivided by the radial blades. This produces an internal pressure acting on the friction disc clutch in accordance with a difference in rotation between the rotary shafts. Thus, the friction disc clutch is engaged by the internal pressure applied thereto to effect drive connection between the rotary shafts. In this instance, the engagement force of the clutch is controlled in proportion to the difference in rotation between the rotary shafts.

In the control coupling described above, the internal pressure of viscous fluid is produced in inverse proportion to the cube of the width of the fluid chamber in an axial direction. For this reason, it is desirable that the fluid chamber is formed as small as possible in width to increase the internal pressure of viscous fluid. In the case, however, that the fluid chamber is reduced in width, the amount of stored viscous fluid becomes small since the fluid chamber may not be enlarged in diameter due to size limitation of the control coupling. This causes the following problems:

(a) The viscous fluid is deteriorated in a short period of time due to thermal and mechanical influences.

(b) The internal pressure is greatly influenced by a difference in the amount of viscous fluid filled in the fluid chamber. It is, therefore, difficult to uniformly determine the torque transmission characteristic of the control coupling.

SUMMARY OF THE INVENTION

Accordingly, it is a primary object of the present invention to provide an improved control coupling for torque transmission which is capable of increasing the internal pressure of viscous fluid without causing any problems discussed above.

According to the present invention, the object is attained by providing a control coupling for torque transmission between a pair of rotary members coaxially arranged for relative rotation, which comprises a cylindrical casing mounted on one of the rotary members for rotation therewith, a friction clutch assembled within the casing for effecting drive connection between the rotary members when it has been engaged, and a thrust mechanism including a thrust piston axially slidably coupled within the casing for rotation therewith and being in engagement with the friction clutch, an end wall member coupled with the casing for rotation therewith and spaced from the piston to form a fluid chamber filled with an amount of viscous fluid, and a rotor having at least one radial blade extending radially outwardly therefrom and being disposed between the piston and end wall member, rotor being shaped to form at least one sub-chamber in the fluid chamber. The sub-chamber at least partially overlaps a portion of the rotor radially aligned therewith, as seen in the direction of rotation of the rotor. The radial blade of the rotor has a base portion thickened in an axial direction to increase the amount of viscous fluid stored in the fluid chamber and an outer end portion formed thinner than the base portion, wherein each internal surface of the piston and the end wall member exposed to the fluid chamber is formed to eorrespond with the opposite surfaces of the radial blade.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
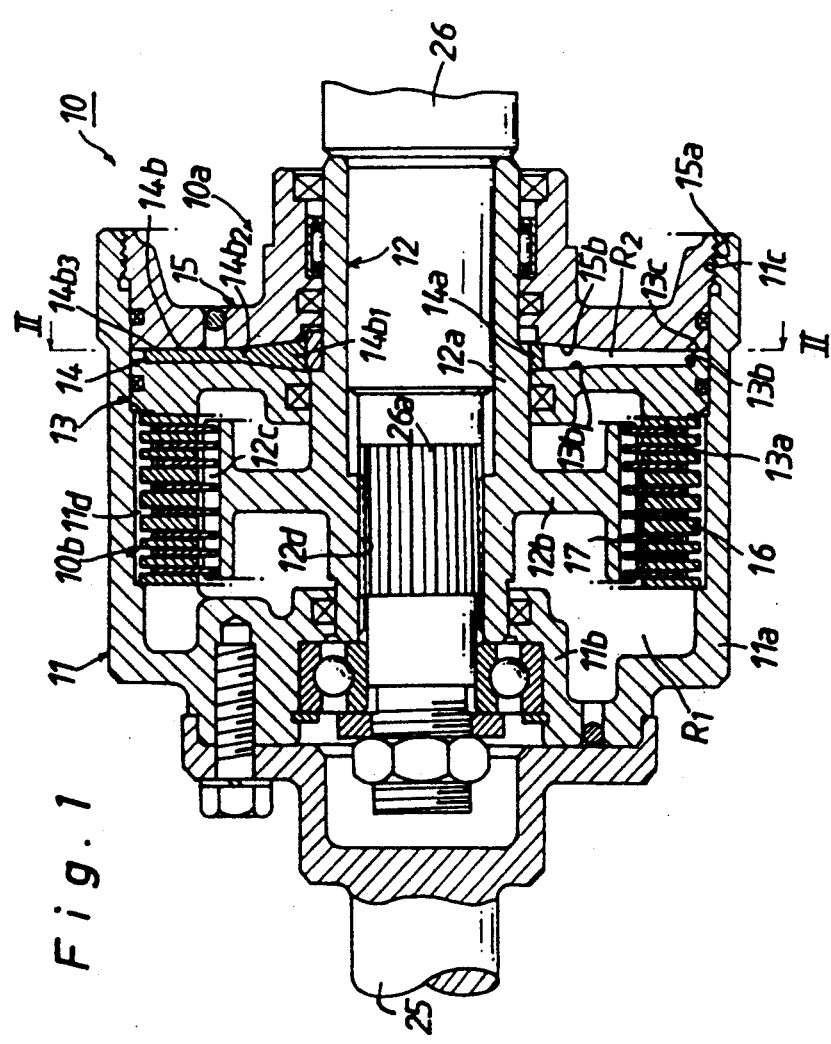
FIG. 1 is a sectional view of a control coupling for torque transmission in accordance with the present invention.
Figure 5:
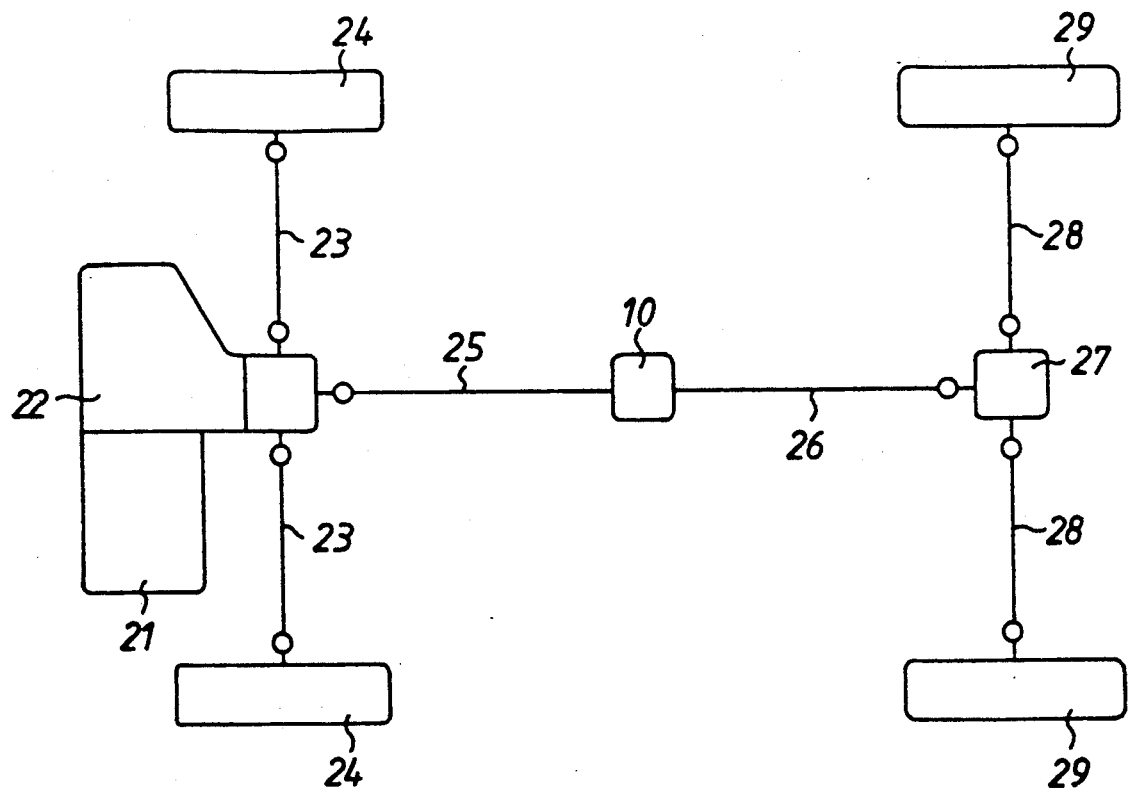
FIG. 5 is a diagrammatic representation of a four-wheel drive vehicle which includes the control coupling shown in FIGS. 1 and 2.

Disclosed in FIG. 1 of the drawings is a control coupling 10 for torque transmission which is disposed in a rear-wheel drive system of a four-wheel drive vehicle as shown in FIG. 5. In the vehicle, the power from a prime mover 21 is transmitted to a set of front road wheels 24 through a transaxle 22 and a pair of split axle shafts 23. The transaxle 22 includes a power transmission in drive connection to the prime mover 21, and a power transfer device combined with the power transmission. The rear-wheel drive system includes a first propeller shaft 25 drivingly connected to the power transfer device of transaxle 22, a second propeller shaft 26 drivingly connected to the first propeller shaft 25 through the control coupling 10, a rear-wheel differential 27 in drive connection to the second propeller shaft 26, and a pair of axle shafts 28 drivingly connected at their one ends to the rear-wheel differential 27 and at their other ends to a set of rear road wheels 29. Thus, the control coupling 10 acts to transmit therethrough the power from the first propeller shaft 25 to the rear road wheels 29 through the second propeller shaft 26, rear-wheel differential 27 and split axle shafts 28.

As shown in FIG. 1, the control coupling 10 comprises a thrust mechanism 10a and a multiple friction disc clutch 10b which are assembled within an annular space between an outer cylindrical casing 11 and an inner sleeve shaft 12. The outer cylindrical casing 11 has a cylindrical wall 11a integrally formed with an inner carrier portion 11b. The cylindrical wall 11a has an open end internally threaded at 11c. The inner sleeve shaft 12 has a stepped sleeve portion 12a integrally formed with a hub portion 12b. The sleeve portion 12a of shaft 12 is internally splined at 12d, and the hub portion 12b of shaft 12 is externally splined at 12c. The sleeve portion 12a has one end rotatably supported by the inner carrier portion 11b of cylindrical casing 11 in a fluid-tight manner and the other end rotatably supported by an end wall member 15 through a needle bearing in a fluid-tight manner. The end wall member 15 is adjustable threaded into the open end of cylindrical wall 11a and fastened in place. The outer cylindrical casing 11 is secured to the rear end of propeller shaft 25 by means of bolts, while the inner sleeve shaft 12 is splined at 12d to the front end 26a of propeller shaft 26 for rotation therewith.

The thrust mechanism 10a comprises an annular thrust piston 13 axially slidably coupled in a fluid-tight manner within the cylindrical wall 11a of casing 11 for rotation therewith to form a fluid chamber $R_1$, and a rotor 14 disposed in a fluid chamber between the thrust piston 13 and end wall member 15. The friction disc clutch 10b is of the wet type and comprises a first set of clutch discs 16 and a second set of clutch discs 17. The first set of clutch discs 16 are axially slidably engaged at their outer peripheries with an internally splined portion 11d of cylindrical wall 11a for rotation therewith, while the second set of clutch discs 17 are axially slidably engaged at 12c with the externally splined hub portion 12b of inner sleeve shaft 12 for rotation therewith and interleaved with the first set of clutch discs 16. The fluid chamber $R_1$ stores therein an amount of viscous fluid such as silicon oil.

Figure 2:
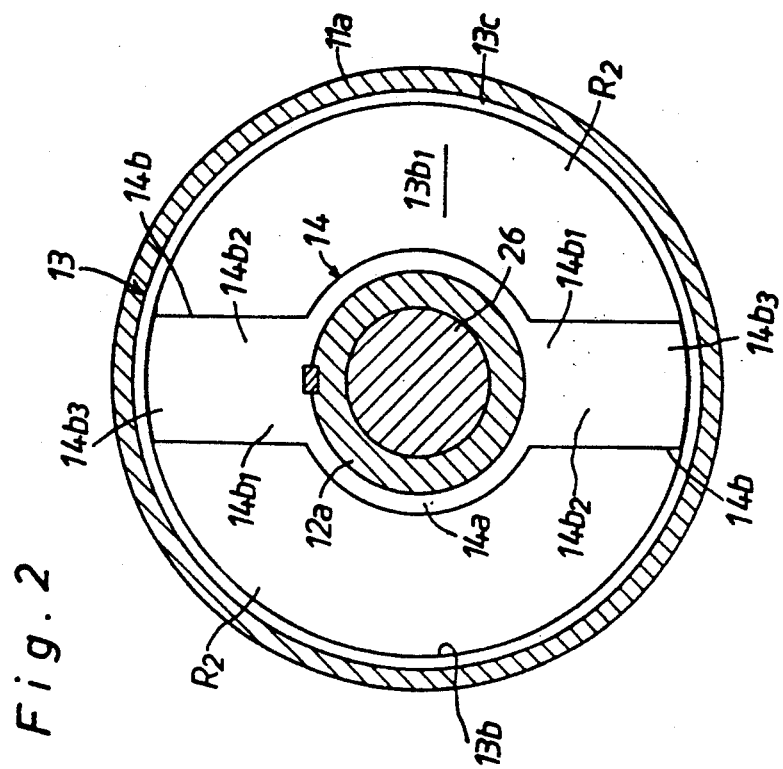
FIG. 2 is a cross-sectional view of the control coupling taken along line II—II in FIG. 1.

The thrust piston 13 is axially slidable and rotatable on the inner sleeve shaft 12 in a fluid-tight manner and is engaged with the right-hand clutch disc 16 at 13a. As shown in FIGS. 1 and 2, the rotor 14 has an annular hub portion 14a mounted on the inner sleeve shaft 12 for rotation there with a pair of radial blades 14b diametrically extending from the hub portion 14b and circumferentially spaced from one another at 180°. The radial blades 14b of rotor 14 each are tapered in width from their base portions $14b_1$ to their intermediate portions $14b_2$ and formed in uniform thickness from their intermediate portions $14b_2$ to their outer ends $14b_3$. The radial blades 14b of rotor 14 each are also formed at their base portions $14b_1$ in the same thickness as that of hub portion 14a. Thus, the rotor 14 is rotatably coupled within annular recess 13b of thrust piston 13 the depth of which is substantially the same as the thickness of rotor 14. The annular recess 13b of piston 13 has an annular bottom surface $13b_1$ tapered radially inwardly to correspond with the left-hand surfaces of radial blades 14b.

The end wall member 15 is positioned in place after adjustment in an axial direction and is in engagement with an annular end 13c of piston 13 to form the sealed fluid chamber containing the rotor 14 therein. The end wall member 15 has an internal annular surface tapered radically inwardly to correspond with the right-hand surfaces of radial blades 14b of rotor 14. The sealed fluid chamber between piston 13 and end wall member 15 is filled with an amount of viscous fluid such as silicon oil. The radial blades 14b of rotor 14 are slidably engaged with an annular periphery of recess 13b at their outer ends to subdivide the sealed fluid sub-chamber into two fluid chambers $R_2$. The radial blades 14b of rotor 14 are slightly spaced from the annular bottom surface $13b_1$ of piston 13 and the internal annular surface 15b of end wall member 15.

The operation of the control coupling shown in FIGS. 1 and 2 is as follows. Assuming that there occurs relative rotation between the propeller shafts 25 and 26 during travel of the vehicle, the cylindrical casing 11, piston 13 and end wall member 15 rotate relatively to the inner sleeve shaft 12 and rotor 14. Thus, the flow of viscous fluid in the subdivided sub-chambers $R_2$ is forcefully caused in a circumferential direction at a speed proportional to the difference in rotation between the propeller shafts 25 and 26. In this instance, an internal pressure is caused by the flow resistance of viscous fluid to increase in proportion to the difference in rotation between the propeller shafts 25 and 26. The internal pressure is applied as a thrust force to the piston 13 to move it toward the friction disc clutch 10b. This causes frictional engagement of the clutch discs 16 and 17 through the viscous fluid in chamber $R_1$. As a result, the control coupling 10 acts to effect drive connection between the propeller shafts 25 and 26 thereby to establish a four-wheel drive mode of the vehicle. During travel of the vehicle at the four-wheel drive mode, the control coupling 10 acts to permit differential rotation of the front and rear road wheels so as to eliminate the occurrence of a tight-corner braking phenomenon.

In the arrangement of the control coupling described above, only the base portion $14b_1$ of rotor 14 is thickened to increase the amount of viscous fluid stored in the sub-chambers $R_2$. This is useful to reduce fatigue of the stored viscous fluid caused by thermal and mechanical influences and to reduce a difference in the amount of viscous fluid stored in the sub-chambers $R_2$ so that the torque transmission characteristic of the control coupling can be uniformly determined during assembly process thereof. Since the fluid chamber between piston 13 and end wall member 15 is enlarged in width only at a portion where a low pressure occurs during relative rotation of the propeller shafts 25, 26, the internal pressure is created in the sub-chambers $R_2$ without any undesired influence. The enlarged portion of the fluid chamber is effective to uniformly create the internal pressure in a radial direction and to cause in a moment the reverse flow of air in the sub-chambers $R_2$ when the relative rotation of propeller shafts 25, 26 has been reversed.

Figure 4:
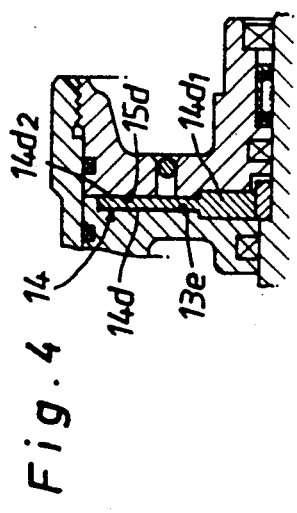
FIG. 4 is a sectional view illustrating another modification of the rotor shown in FIG. 1.
Figure 3:
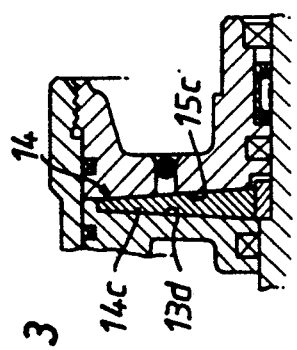
FIG. 3 is a sectional view illustrating a modification of a rotor shown in FIG. 1.

In FIG. 3 there is illustrated a modification of the rotor 14, wherein the radial blades each are tapered in width from their base ends to their outer ends as indicated by the reference numeral 14c, and wherein the annular bottom surface of recess 13b in piston 13 and the internal annular surface of end wall member 15 are tapered radially outwardly as indicated by the reference numerals 13d and 15c to correspond with the tapered surfaces of the radial blades 14c. In FIG. 4 there is illustrated another modification of the rotor 14, wherein the radial blades each are replaced with a stepped radial blade 14d which is thickened at its base portion $14d_1$ and formed at its outer end portion $14d_2$ in uniform thickness thinner than the base portion $14d_1$, and wherein the annular bottom surface of recess 13b in piston 13 and the internal annular surface of end wall member 15 are stepped as indicated by the reference numerals 14d and 15d to correspond with the stepped surfaces of radial blade 14d.

What is claimed is:

1. A control coupling for torque transmission between a pair of rotary members coaxially arranged for relative rotation, comprising a cylindrical casing mounted on one of the rotary members for rotation therewith, a friction clutch assembled within said casing for effecting drive connection between the rotary members when it has been engaged, and a thrust mechanism including a thrust piston axially slidably coupled within said casing for rotation therewith and being in engagement with said friction clutch, an end wall member coupled with said casing for rotation therewith and spaced from said piston to form a fluid chamber filled with an amount of viscous fluid, and a rotor disposed in said fluid chamber and mounted on the other rotary member for rotation therewith, said rotor having at least one radial blade extending radially outwardly therefrom and being disposed between said piston and said end wall member, said rotor being shaped to form at least one sub-chamber in said fluid chamber, each said sub-chamber at least partially axially overlapping a portion of said rotor radially aligned therewith, as seen in the direction of rotation of said rotor, wherein the radial blade of said rotor has a base portion thickened in an axial direction to increase the amount of viscous fluid stored in said fluid sub-chamber and an outer end portion formed thinner than the base portion in the axial direction, and wherein an internal surface of said piston and said end wall member exposed to said fluid chamber if formed to correspond with opposite surfaces of said radial blade.

2. A control coupling as claimed in claim 1, wherein the radial blade of said rotor is tapered in width from its base portion to its intermediate portion and formed in uniform thickness from its intermediate portion to its outer end portion.

3. A control coupling as claimed in claim 1, wherein the radial blade of said rotor is tapered in width from its base portion to its outer end portion.

4. A control coupling as claimed in claim 1, wherein the radial blade of said rotor is in the form of a stepped radial blade which is thickened at its base portion and formed at its outer end portion in uniform thickness thinner than the base portion.

5. A control coupling as claimed in claim 1, wherein said rotor is rotatably coupled within an annular recess formed in said piston.

* * * * *